US008582052B2

(12) United States Patent
Ockerse (10) Patent No.: US 8,582,052 B2
(45) Date of Patent: Nov. 12, 2013

(54) DISCRETE LED BACKLIGHT CONTROL FOR A REDUCED POWER LCD DISPLAY SYSTEM

(75) Inventor: Harold C. Ockerse, Holland, MI (US)

(73) Assignee: Gentex Corporation, Zeeland, MI (US)

(*) Notice: Subject to any disclaimer, the term of this patent is extended or adjusted under 35 U.S.C. 154(b) by 726 days.

(21) Appl. No.: 12/196,476

(22) Filed: Aug. 22, 2008

(65) Prior Publication Data

US 2010/0045899 A1 Feb. 25, 2010

(51) Int. Cl.
*G02F 1/1335* (2006.01)
*G01D 11/28* (2006.01)
*F21V 7/04* (2006.01)
*G09G 3/12* (2006.01)
*G09G 3/14* (2006.01)
*G09G 3/04* (2006.01)
*G09G 3/34* (2006.01)
*G06F 15/00* (2006.01)
*G06F 15/16* (2006.01)
*G06F 15/80* (2006.01)

(52) U.S. Cl.
USPC ............ 349/61; 349/68; 349/69; 349/70; 349/71; 362/23.1; 362/23.12; 362/23.15; 362/612; 362/613; 345/36; 345/39; 345/40; 345/46; 345/84; 345/501; 345/502; 345/503; 345/504; 345/505

(58) Field of Classification Search
USPC .......... 349/13, 16, 61–62, 65–69; 362/27, 29, 362/31–32, 309, 611, 615, 619, 555; 345/36–51, 84, 87, 112, 501–506
See application file for complete search history.

(56) References Cited

U.S. PATENT DOCUMENTS

| | | | |
|---|---|---|---|
| 4,109,235 A | 8/1978 | Bouthors | |
| 4,638,287 A | 1/1987 | Umebayashi et al. | |
| 4,740,838 A | 4/1988 | Mase et al. | |
| 4,910,591 A | 3/1990 | Petrossian et al. | |
| 5,005,213 A | 4/1991 | Hanson et al. | |
| 5,197,562 A | 3/1993 | Kakinami et al. | |
| 5,230,400 A | 7/1993 | Kakinami et al. | |
| 5,243,417 A | 9/1993 | Pollard | |
| 5,289,321 A | 2/1994 | Secor | |
| 5,340,988 A * | 8/1994 | Kingsley et al. | 250/370.09 |
| 5,408,357 A | 4/1995 | Beukema | |
| 5,426,723 A * | 6/1995 | Horsley | 345/428 |
| 5,469,298 A | 11/1995 | Suman et al. | |
| 5,488,496 A | 1/1996 | Pine | |
| 5,634,709 A | 6/1997 | Iwama | |
| 5,670,935 A | 9/1997 | Schofield et al. | |
| 5,680,123 A | 10/1997 | Lee | |
| 5,708,410 A | 1/1998 | Blank et al. | |
| 5,764,139 A | 6/1998 | Nojima et al. | |
| 5,793,308 A | 8/1998 | Rosinski et al. | |
| 5,793,420 A | 8/1998 | Schmidt | |
| 5,949,331 A | 9/1999 | Schofield et al. | |
| 6,106,121 A | 8/2000 | Buckley et al. | |
| 6,175,300 B1 | 1/2001 | Kendrick | |
| 6,191,704 B1 | 2/2001 | Takenaga et al. | |

(Continued)

*Primary Examiner* — Hoan C Nguyen
(74) *Attorney, Agent, or Firm* — Price Heneveld LLP; Scott P. Ryan (57) ABSTRACT

Backlit LCD displays are becoming commonplace within many vehicle applications. The unique advantage of this invention is that it optimizes system power savings for display of low dynamic range (LDR) images by dynamically controlling spatially adjustable backlighting. This is accomplishes through use of a control technique that takes into account the sequential nature of the video display process.

15 Claims, 10 Drawing Sheets

(56) References Cited

U.S. PATENT DOCUMENTS

| | | |
|---|---|---|
| 6,200,010 B1 | 3/2001 | Anders |
| 6,218,934 B1 | 4/2001 | Regan |
| 6,281,804 B1 | 8/2001 | Haller et al. |
| 6,412,959 B1 | 7/2002 | Tseng |
| 6,424,272 B1 | 7/2002 | Gutta et al. |
| 6,424,273 B1 | 7/2002 | Gutta et al. |
| 6,447,128 B1 | 9/2002 | Lang et al. |
| 6,456,438 B1 * | 9/2002 | Lee et al. ............... 359/630 |
| 6,472,977 B1 | 10/2002 | Pochmuller |
| 6,483,613 B1 * | 11/2002 | Woodgate et al. ............. 359/19 |
| 6,498,620 B2 | 12/2002 | Schofield et al. |
| 6,501,387 B2 | 12/2002 | Skiver et al. |
| 6,520,667 B1 | 2/2003 | Mousseau |
| 6,545,598 B1 | 4/2003 | de Villeroche |
| 6,572,233 B1 | 6/2003 | Northman et al. |
| 6,611,202 B2 | 8/2003 | Schofield et al. |
| 6,630,888 B2 | 10/2003 | Lang et al. |
| 6,642,840 B2 | 11/2003 | Lang et al. |
| 6,642,851 B2 | 11/2003 | Deline et al. |
| 6,648,477 B2 | 11/2003 | Hutzel et al. |
| 6,674,370 B2 | 1/2004 | Rodewald et al. |
| 6,690,268 B2 | 2/2004 | Schofield et al. |
| 6,847,487 B2 | 1/2005 | Burgner |
| 6,930,737 B2 | 8/2005 | Weindorf et al. |
| 7,046,448 B2 | 5/2006 | Burgner |
| 7,324,174 B2 * | 1/2008 | Hafuka et al. ............... 349/61 |
| 7,707,621 B2 * | 4/2010 | Walmsley ............... 726/2 |
| 2003/0002165 A1 | 1/2003 | Mathias et al. |
| 2003/0035050 A1 | 2/2003 | Mizusawa |
| 2003/0090568 A1 | 5/2003 | Pico |
| 2003/0122930 A1 | 7/2003 | Schofield et al. |
| 2003/0169158 A1 | 9/2003 | Paul, Jr. |
| 2004/0032321 A1 | 2/2004 | McMahon et al. |
| 2004/0056955 A1 | 3/2004 | Berberich et al. |
| 2004/0080404 A1 | 4/2004 | White |
| 2004/0080431 A1 | 4/2004 | White |
| 2004/0090317 A1 | 5/2004 | Rothkop |
| 2004/0107617 A1 | 6/2004 | Shoen et al. |
| 2004/0202001 A1 | 10/2004 | Roberts et al. |
| 2004/0239849 A1 * | 12/2004 | Wang ............... 349/115 |
| 2005/0140855 A1 | 6/2005 | Utsumi |
| 2006/0007550 A1 | 1/2006 | Tonar et al. |
| 2006/0279522 A1 * | 12/2006 | Kurihara ............... 345/102 |
| 2007/0171037 A1 | 7/2007 | Schofield et al. |
| 2008/0068520 A1 * | 3/2008 | Minikey et al. ............... 349/11 |
| 2008/0084512 A1 * | 4/2008 | Brott et al. ............... 349/15 |
| 2009/0184904 A1 | 7/2009 | S. et al. |

\* cited by examiner

DISCRETE LED BACKLIGHT CONTROL FOR A REDUCED POWER LCD DISPLAY SYSTEM

CROSS REFERENCE TO RELATED APPLICATIONS

This application is related to U.S. Provisional Application No. 60/780,655 filed on Mar. 9, 2006; U.S. Provisional Application No. 60/804,351 filed on Jun. 9, 2006; U.S. Patent Application Publication Number 2008/0068520, filed on Mar. 9, 2007, now U.S. Pat. No. 8,339,526; and U.S. Patent Application Publication Number 2009/0096937, filed on Aug. 18, 2008. The entire disclosures of each of these applications are incorporated herein by reference.

BACKGROUND OF THE INVENTION

Backlit LCD displays are becoming commonplace within many vehicle applications. Often times a display is positioned such that ambient light washes out light projected from the display resulting in poor contrast.

SUMMARY OF THE INVENTION

The unique advantage of this invention is that it optimizes system power savings for display of low dynamic range (LDR) images by dynamically controlling spatially adjustable backlighting. This is accomplishes through use of a control technique that takes into account the sequential nature of the video display process.

DETAIL DESCRIPTION

Figure 1:
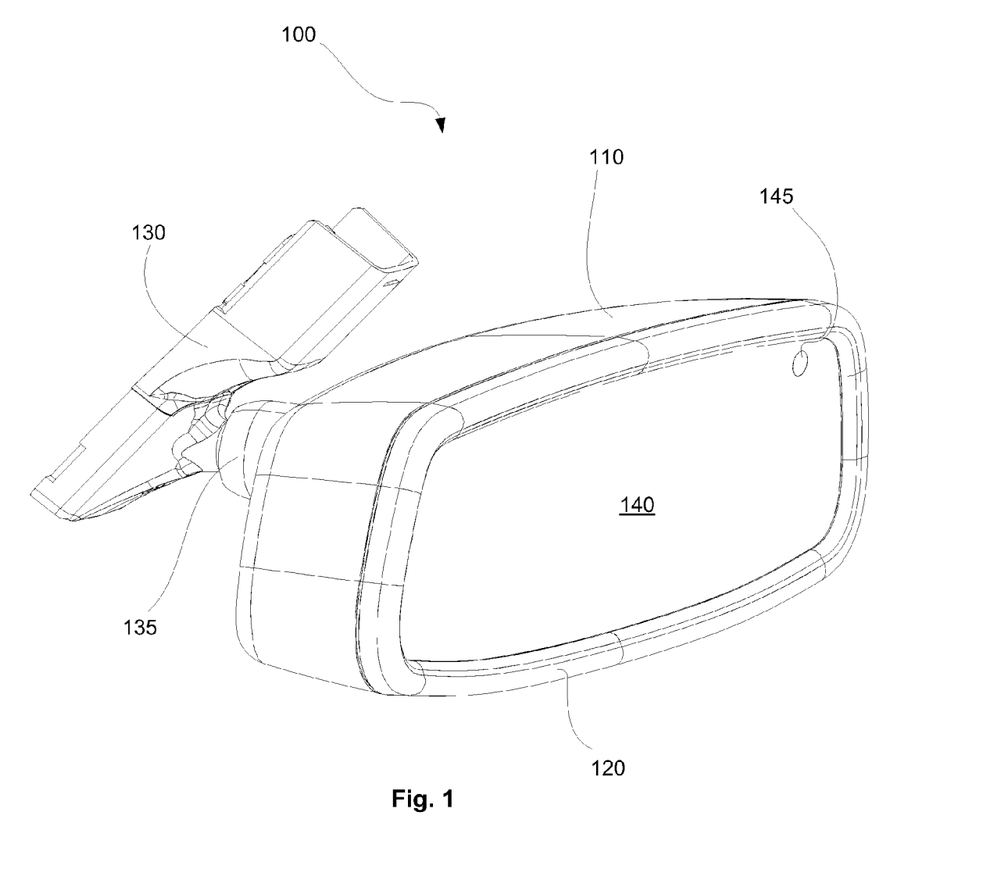
FIG. 1 depicts a front perspective view of a rearview assembly.

Turning initially to FIG. 1 a rearview assembly 100 is depicted for use in a vehicle comprising a housing 110, a bezel 120, a window mounting structure 130 with a stem 135 attaching the housing to the window mounting structure. In at least one embodiment a transflective mirror element 140 is positioned within an assembly. The mirror element may comprise a window 145 configured to provide light transmission through the mirror element to a glare light sensor (not shown).

Figure 2:
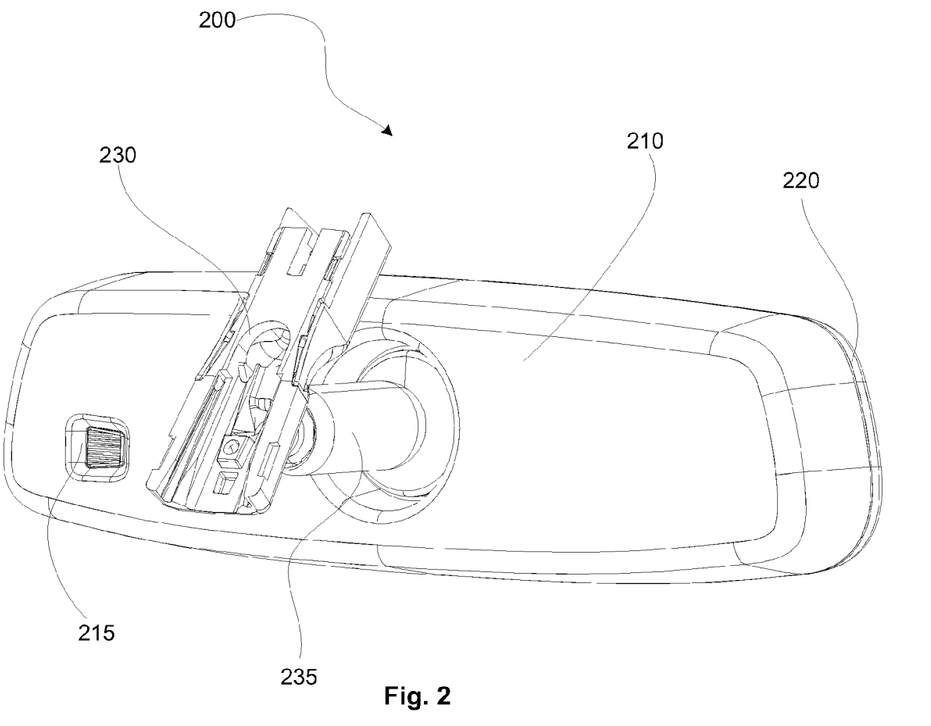
FIG. 2 depicts a rear perspective view of a rearview assembly.

FIG. 2 depicts a rear perspective view of a rearview assembly 200 comprising a housing 210, a bezel 220, a window mounting structure 230 with a stem 235 attaching the housing to the window mounting structure. In at least one embodiment an opening 215 is provided in a housing configured to provide light transmission through the housing to an ambient light sensor (not shown).

Figure 3:
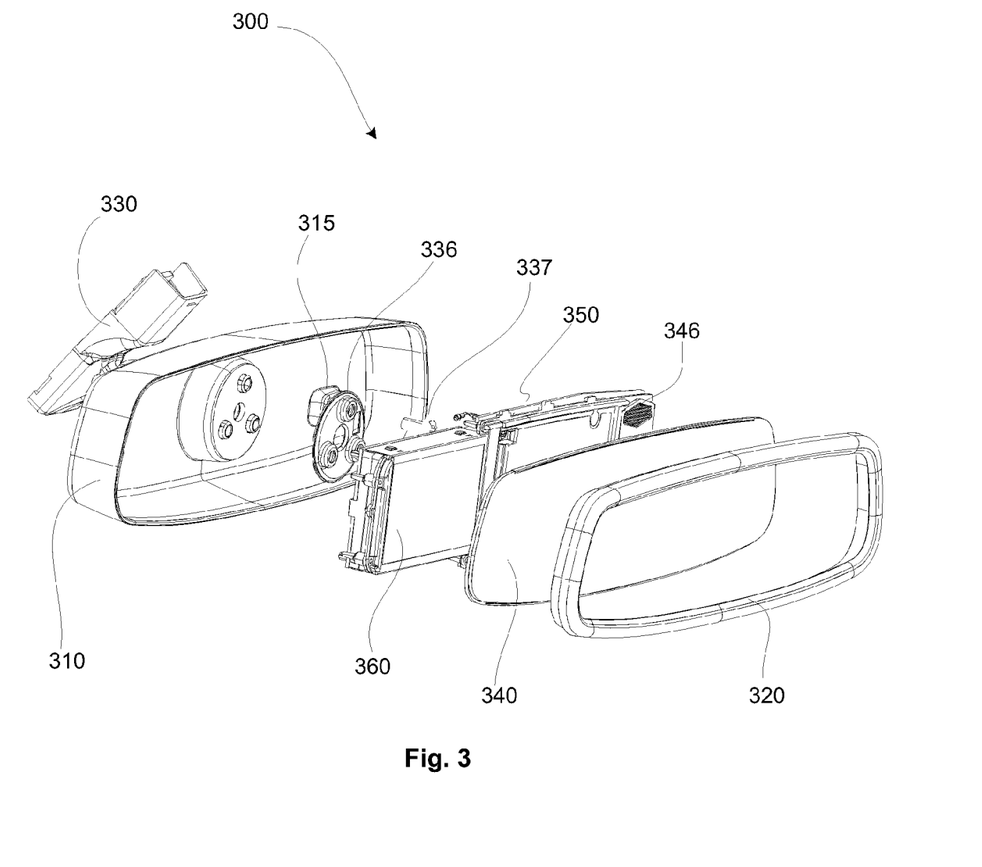
FIG. 3 depicts a front exploded perspective view of a rearview assembly.

Turning to FIG. 3 an exploded, perspective, view of a rearview assembly 300 is depicted for use in a vehicle comprising a housing 310, a bezel 320, a window mounting structure 330 attaching the housing via washer 336 and mounting screws 337 to the stem. In at least one embodiment a transflective mirror element 340 is positioned within an assembly. A transflective mirror element can be a mirror element having a partially reflective, partially transmissive coating. In at least one embodiment an opening 315 is provided in a housing configured to provide light transmission through the housing to an ambient light sensor (not shown). In at least one embodiment a display sub-assembly 350 comprising a backlit LCD 360 and a secondary glare light optic element 346 is positioned within an assembly.

Figure 4:
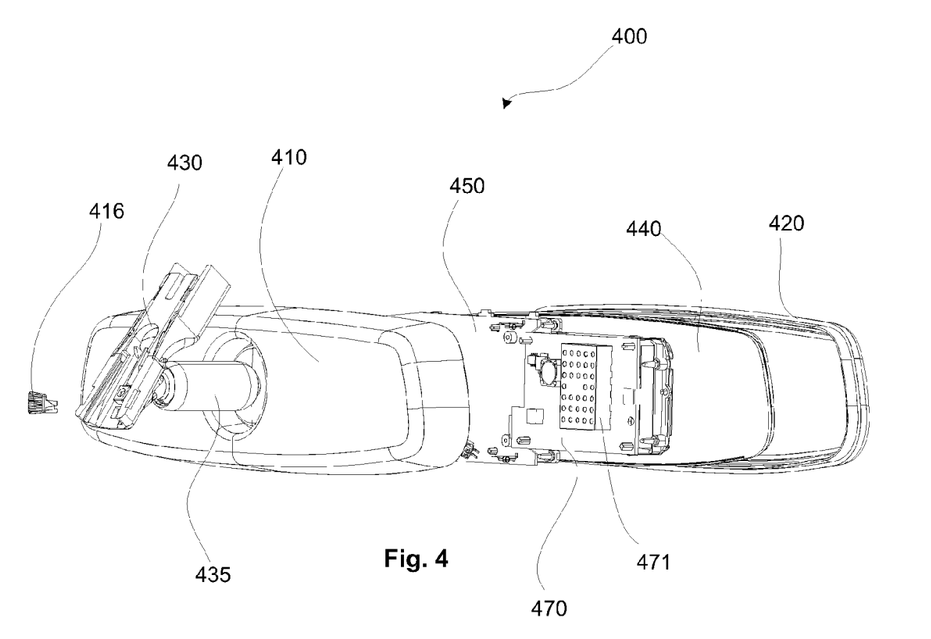
FIG. 4 depicts a rear exploded perspective view of a rearview assembly.

FIG. 4 depicts an exploded rear, perspective, view of a rearview assembly 400 comprising a housing 410, a bezel 420, a window mounting structure 430 with a stem 435 attaching the housing to the window mounting structure. In at least one embodiment a secondary ambient light sensing optic element 416 is provided in a housing configured to provide light transmission to an ambient light sensor (not shown). In at least one embodiment a display sub-assembly 450 comprising a backlit LCD having an aluminum LED circuit board 470 and a video driver chip shield 471 is positioned within an assembly.

Figure 5:
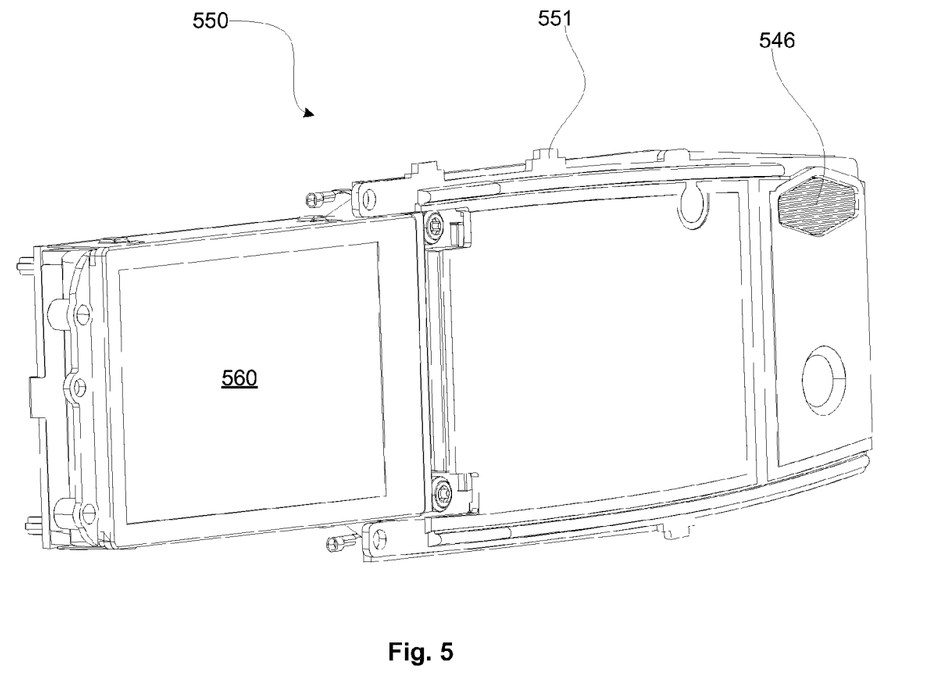
FIG. 5 depicts a front perspective view of a display sub-assembly.
Figure 6:
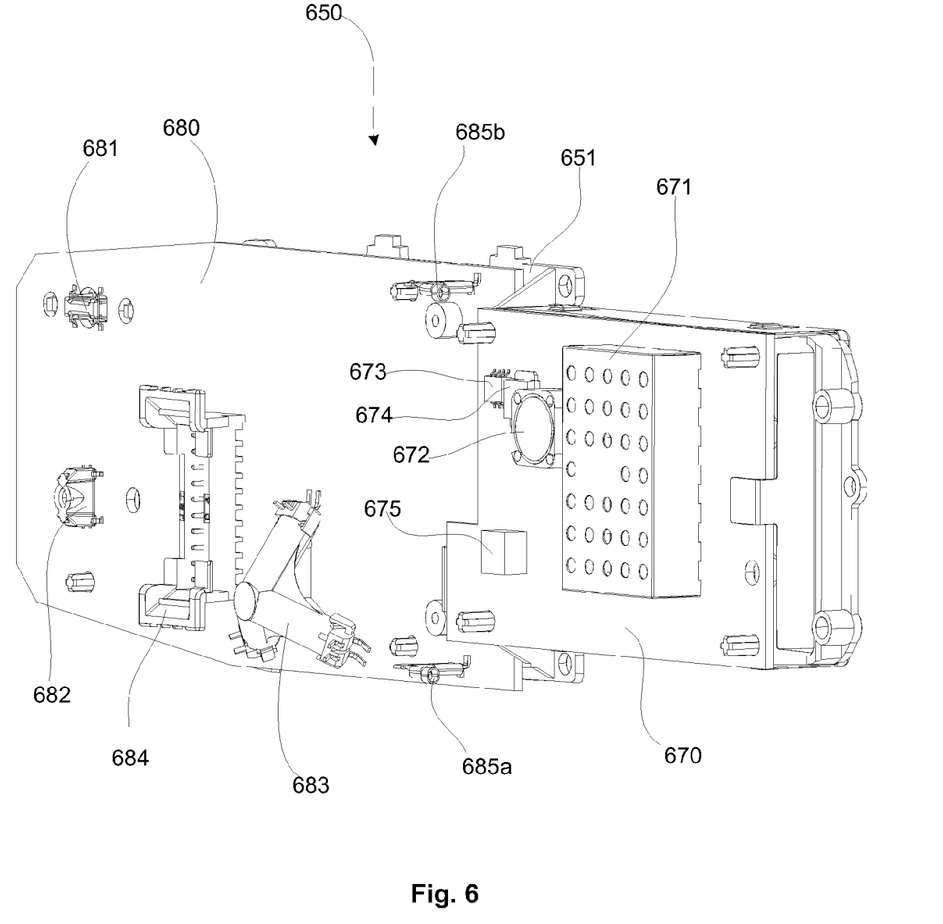
FIG. 6 depicts a rear perspective view of a display sub-assembly.

FIG. 5 depicts a display sub-assembly 550 comprising a carrier plate 551, a backlit LCD 560 and a secondary glare light optics element 546 is positioned within an assembly. FIG. 6 depicts a display sub-assembly 650 comprising a carrier plate 651, a backlit LCD having a LED circuit board 670, a video driver chip shield 671, an EMI reducing inductor 672, a power diode 674, switching power supply transistor 673, and a switching power supply controller chip 675 is positioned within an assembly. In at least one embodiment a printed circuit board 680 comprising a glare light sensor 681, an ambient light sensor 682, a connector 684, a compass sensor 683, a first electrical connector 685a and a second electrical connector 685b is incorporated within an assembly.

Figure 7:
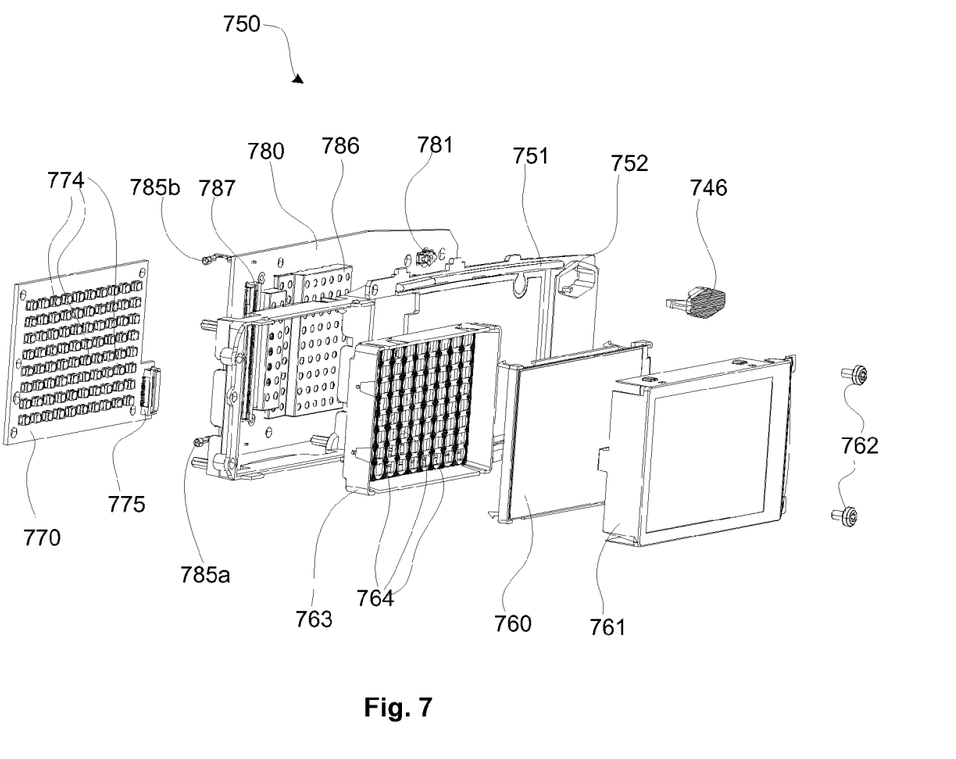
FIG. 7 depicts a front exploded perspective view of a display sub-assembly.

Turning now to FIG. 7, a display sub-assembly 750 comprising a carrier plate 751, a LED circuit board 770 with LEDs 774 and power connector 775 is depicted. In at least one embodiment a printed circuit board 780 comprising a glare light sensor 781, a LCD connector 787, a GPU shield 786, a first electrical connector 785a and a second electrical connector 785b is incorporated within an assembly. In at least one embodiment a carrier plate 751 having an opening 752 for receiving a secondary glare light sensor optics element 746 is provided for carrying a LED reflector module 763 having a series of reflectors 764, an LCD 760 and a retainer 761 secured with retaining screws 762.

Figure 8:
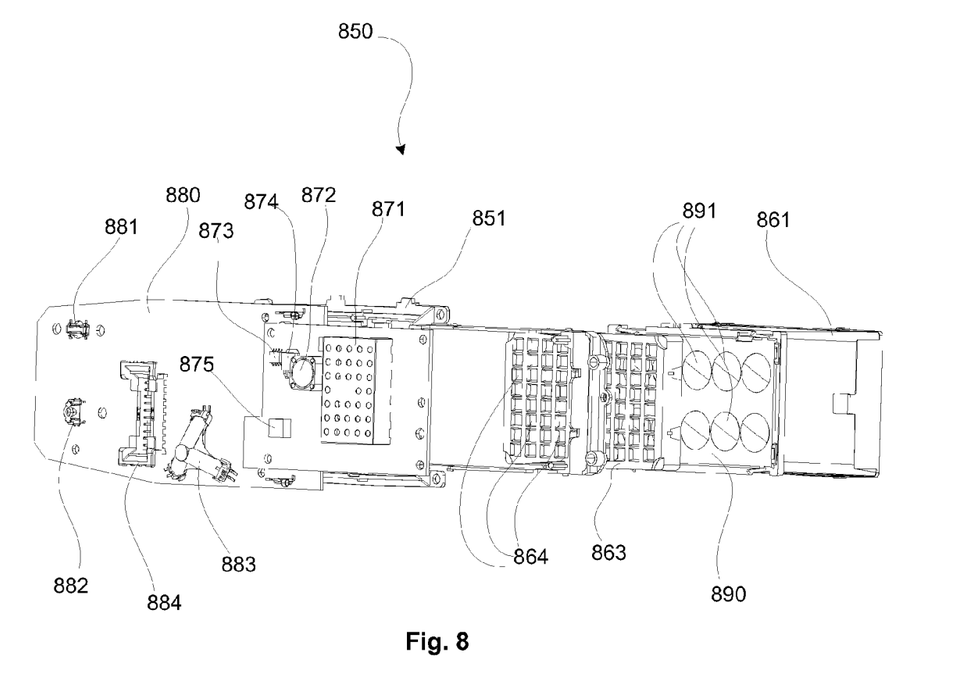
FIG. 8 depicts a rear exploded perspective view of a display sub-assembly.

FIG. 8 depicts a display sub-assembly 850 comprising a carrier plate 851, a backlit LCD having a LED circuit board 870, a video driver chip shield 871, an EMI reducing inductor 872, a power diode 874, switching power supply transistor 873, and a switching power supply controller chip 875 is positioned within an assembly. In at least one embodiment a printed circuit board 880 comprising a glare light sensor 881, an ambient light sensor 882, a connector 884, a compass sensor 883, a first electrical connector 685a and a second electrical connector 885b is incorporated within an assembly. In at least one embodiment a carrier plate 851 for carrying a LED reflector module 863 having a series of reflectors 864, an LED optics element 890 having a series of individual LED optics 891 and a retainer 861 is incorporated.

Use of a display placed behind the reflective surface of a vehicle mirror necessitates a considerable expenditure of power to overcome transmission losses. This power requirement becomes even greater as attempts are made to match the dynamic range to that of a display placed behind a non-reflective surface. Dynamic range is typically defined as the contrast difference between the darkest possible pixel and the brightest possible pixel. The presence of a reflective outer surface limits the darkest possible pixel to the brightness level reflected by the mirrored surface when the pixel is in an off state plus any associated light leakage. Clearly displays behind mirror systems demand significant amounts of power to provide any reasonable amount of dynamic range.

There are display systems becoming available that are based on the fundamental idea of using an LCD panel as an optical filter of programmable transparency to modulate a low resolution LED image from a second display. The primary design focus appears to be the display of HDR images with little effort made to minimize power for LDR images. The premise for these designs is based on the thought that the LCD can achieve high brightness, but with limited dynamic range. The only way to improve the dynamic range of an LCD is to modulate the backlight.

A problem encountered if the low resolution LED pixels are too large, that is the area covered by a single LED is large, is that the viewer will begin to discern various aberrations when viewing HDR images. Adding additional LED can result in a considerable cost increase not to mention design and manufacturing complexity. However, concentrating on displaying LDR images instead of HDR images could allow the use of fewer LED pixels and hence will reduce cost and complexity.

The objective of this invention is to increase the dynamic range of the displayed image in a system where the display is placed behind a reflective surface. The dynamic range will be increased to a level at least comparable to a typical LDR image viewed through a non-reflective surface while minimizing the power, cost and complexity.

In a 24-bit pixel graphic there are three "channels", which represent the three primary additive colors: red, green and blue (RGB). The red channel contains information about how much red is contained in each pixel of the image, the green channel low much green and so on. Each channel takes up eight of the 24 bits used to represent each pixel. In a system that includes an LCD, the color and intensity of the image displayed is a combination of the LCD transparency for each filter channel and the backlight. In the case of a white LED backlight, the resulting image can be approximated by multiplying the intensity of the LED by the RGB transmission of each LCD filter. There will be some color shift due to the fact that the LCD filters are not ideal and the LED can not be perfectly represented by equal amounts of R, G and B. However, this is a good first order approximation that works to introduce the invention. In the actual system, color correction lookup tables (LUT) can be used to adjust for non-ideal and non-linear color response issues.

FIGS. 9a-9d depict the basic system structure of the present invention. There are two processors in this system; however this could be accomplished with just a single processor. Two processors are used to allow greater flexibility in vehicle bus 994b implementation. The first processor 990b takes in various display control and content information from a vehicle interface such as CAN 994b. The first processor also is responsible for the measurement of ambient 982b and glare light 981b levels.

Figure 9A:
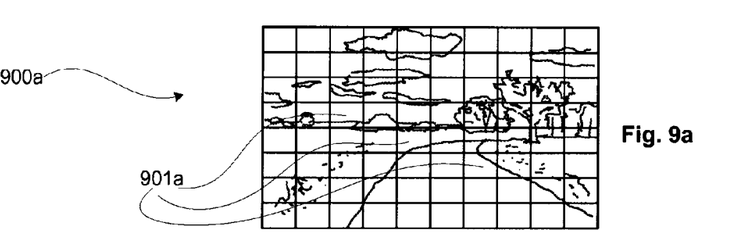
FIGS. 9a-9d depict various details of a display assembly.
Figures 9B, 9C, 9D:
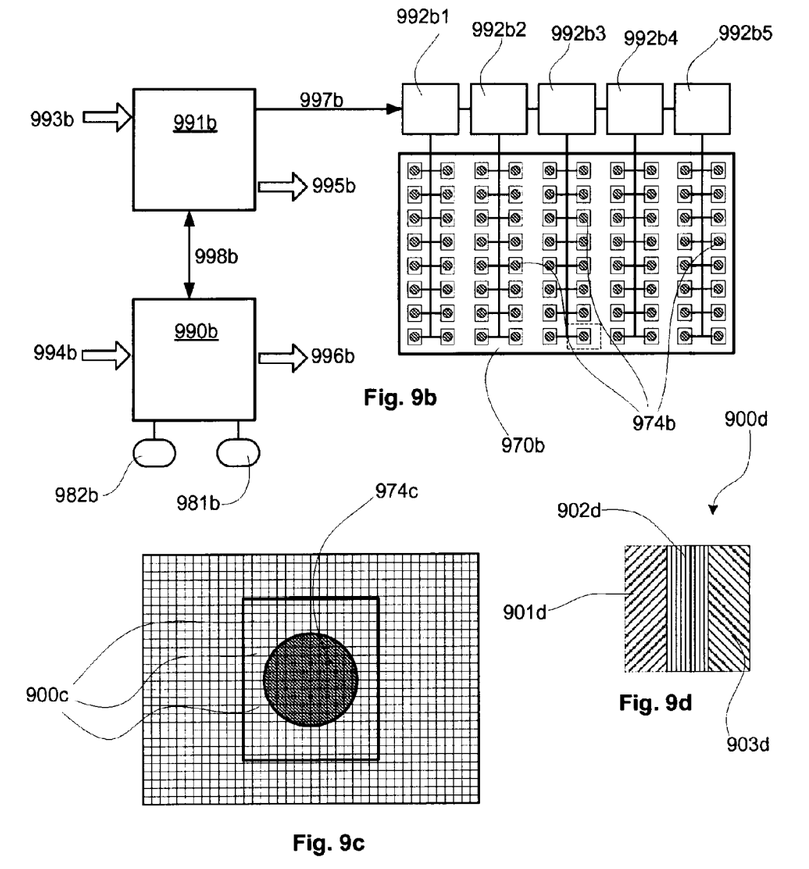

The ambient and glare light intensities are used to control the dimming level of the electro chromic (EC) mirror element 996b. The ambient and glare intensities along with the present EC state 998b are communicated to the second processor 991b for purposes of setting a target backlight level. The second processor is referred to as the Graphics Possessing Unit (GPU). It is responsible for consuming the video stream 993b along with generating additional graphical content for display. The GPU is also given the task of setting the backlight 970b level of each white LED 974b. Note that this invention utilizes white LED, but a combination of red, green and blue LED would work as well with the associated added expense of tripling the number of LED needed.

The GPU is connected with a SPI bus 997b to an array of LEDs through five 16-channel, 12-bit PWM LED drivers 992b1, 992b2, 992b3, 992b4, 992b5. This allows the GPU to set the individual light level of up to 80 LEDs. The LEDs form a backlight 970b placed behind a WQVGA TFT-LCD 900a with 400×240 pixels. This results effectively in a 40×30 pixel area 900c for each LED 974c. Finally, each pixel is comprised of three filters 900d designated R 901d, G 902d and B 903d with the transparency being set by the GPU through the LCD control controller FIG. 9a depicts an eight by ten matrix 901a superimposed over a LDR image 900a. Each cell of the matrix represents the area illuminated by each LED. This particular image demonstrates the wide light variation within a typical video scene. Transmissive displays such as LCD are passive devices that allow a portion of incident light to pass through each pixel. Standard LCDs are combined with a passive light source such as a CCFL which provide uniform and constant light field at the back of the LCD. A spatially modulated LED backlight allows the bright regions to be brightly lit and the darker regions less so. The LED approach would be on average two or more times more power efficient than a conventional LCD display of the same brightness.

Figure 10:
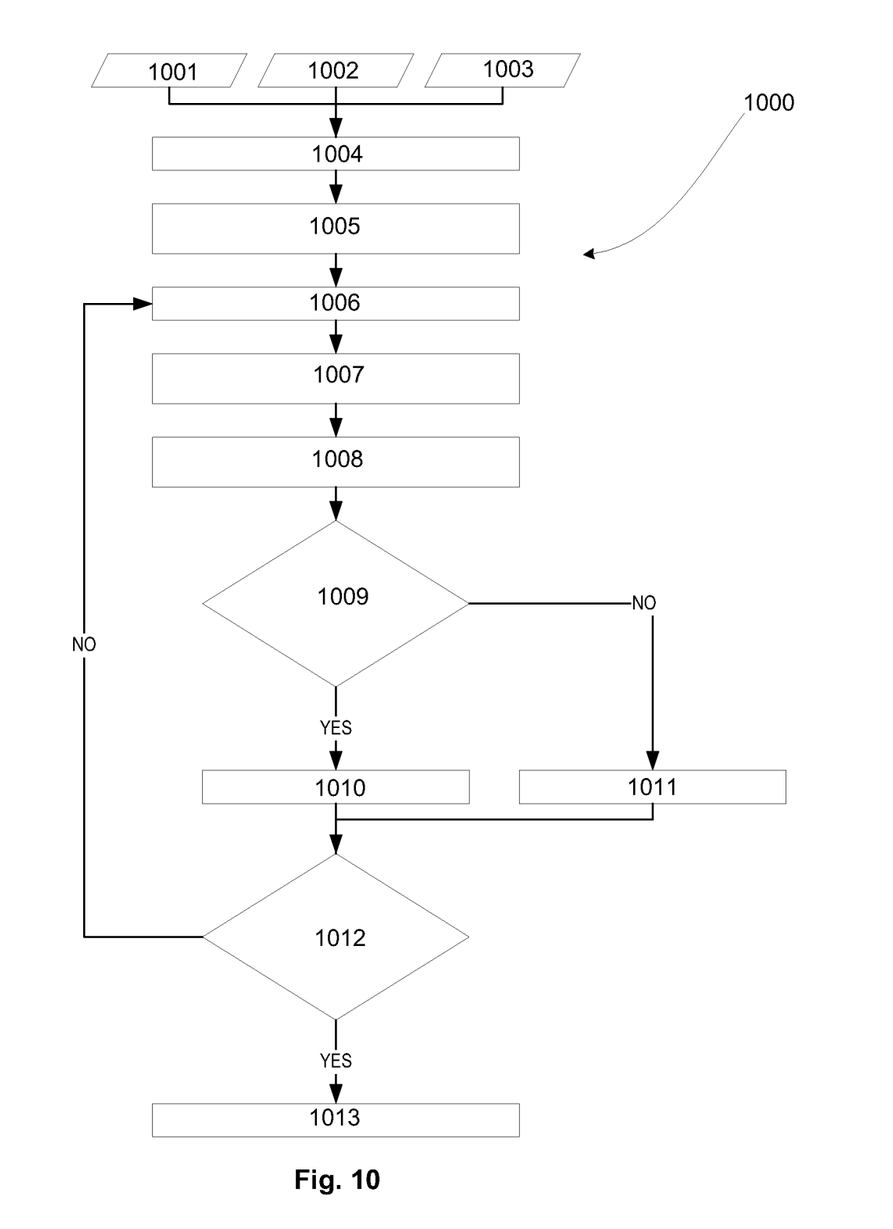
FIG. 10 depicts a flow diagram for display backlight adjustment.

FIG. 10 depicts a flow chart 1000 that details the algorithm used to control the individual light intensity of each LED within the LED array. Following are a few examples to go in hand with the flow chart of FIG. 10:

Example 1

Within LCD Cell $BL_T$=(100,100,100) target intensity for display
$SF_T$=0.75 intensity control for cell
$BL_{CELL}$=(75,75,75) LED intensity for cell Example 1a $P_{IN}$=(200,100,10) pixel in cell
$SF_P$=0.75 near cell center
$P_{CALC}$=(267,133,13) overflow condition
$P_{OUT}$=(255,133,13) error, increase $SF_T$ Example 1b $P_{IN}$=(150,100,10) pixel in cell
$SF_P$=0.75 near center of cell
$P_{OUT}$=(200,133,13) no overflow, $P_{OUT}$=$P_{CALC}$ Example 1c $P_{IN}$=(150,100,10) pixel in cell
$SF_P$=0.65 away from cell center
$P_{OUT}$=(230,154,15) no overflow, $P_{OUT}$=$P_{CALC}$ Equations:

$$BL_{CELL} = BL_T * SF_T$$

$$P_{CALC} = P_{IN}/SF_P$$

$$P_{OUT} = MIN(P_{CALC}, 255)$$

The objective of the invention as stated is to maximize the dynamic range within the confines of a LDR image while minimizing power consumption by the backlight. To accomplish this objective the LED intensity for LCD cell is set to maximize the pixel values within the cell. Higher pixel values mean higher transparency and hence more light from the LED makes it through the display. More light means higher efficiency resulting in an overall reduction in system power.

The means to accomplish this task is analogous to an exposure algorithm used to capture an image. A typical exposure algorithm adjusts the integration time to minimize the number of overexposed pixels while maximizing the overall contrast. The backlight display algorithm outlined herein defines a Scale Factor (SF) that is analogous to the integration time. By adjusting the SF the backlight algorithm seeks to minimize the number of saturated LCD pixels while maximizing the displayed contrast. The first step is to determine the appropriate backlight level to optimize dynamic range of the display system.

In its simplest form, the backlight level setting algorithm simply takes the existing ambient light level 1002 and scales the backlight accordingly. This might be linear, logarithmic or any number of nonlinear functions relating the display intensity to the ambient light level. More complex forms of the algorithm would take into account the glare light level 1001 (a measure of the light falling directly on the display) and the amount of commanded EC dimming 1003. The net result is that a global or Target Backlight ($BL_T$) level is determined 1004. A conventional LCD backlight level setting algorithm would stop here and set the passive light source to the appropriate level. This would then provide a uniform and constant light field at the back of the display. For the spatially modulated backlight of this invention the next step is to determine the intensity for each LED. This is accomplished through the Target Scale Factor ($SF_T$) 1005.

As mentioned previously, the $SF_T$ is iteratively adjusted based on the displayed content. This could be derived recursively within the context of a single displayed image, or with considerably less computation expenditure and minimal loss in accuracy the $SF_T$ can be used from the previous frame and adjusted for the next. There is one $SF_T$ defined for each LED/LCD cell 1006. So, a display with 80 LED will have 80 $SF_T$ variables 1007. Again, the $SF_T$ is used to adjust the light level of each LED and is in a range of zero to one. A value of one will set the LED within a cell to the $BL_T$. A value less than one will set the LED within a cell to something less that the $BL_T$. In the latter case, the LCD transparency must be increased to account for the reduction in the backlight level. If the light level is uniform within the cell then this is simply a matter of increasing the transparency by the inverse of the $SF_T$. However, this is not the case and each LED will have its own Point Spread Function (PSF). In a properly designed system, the PSF for neighboring LED overlap and determining the resulting light intensity at each pixel is more of a challenge.

Determining the light intensity at each LCD pixel is essentially a convolution problem. The first step is to approximate the measure PSF with something like a Gaussian, and then convolve the LED array with the approximate PSF at the resolution of the LCD. As an alternative, a texture of the PSF could be created and combined with all its neighbors at the appropriate scale (is. $SF_T$) within a GPU frame buffer. Finally, since the focus of the invention is on the display of LDR images and not HDR images a simple linear or bi-linear technique can be used with acceptable accuracy and minimal display aberrations. In all cases, the final result is a Scale Factor for each Pixel ($SF_P$). The inverse of the $SF_P$ is multiplied by its corresponding pixel (PM) to set the appropriate LCD drive level for each pixel (Pout) 1008. This is shown by example in the above equations. Should any pixel within a specific LCD cell saturate 1009, the corresponding $SF_T$ is increased to reduce the possibility of saturation 1010. If no pixel within a specific LCD cell saturates then the corresponding $SF_T$ is decreased to minimize system power 1011. There are a number of alternative criteria that might be considered such as allowing a certain percentage of cells to saturate. This trades off some level of video distortion with increased levels of system power savings. Similarly, tile terms "increase" and "reduce" as applied to the SFT should be loosely interpreted. There are a number of alternate control methods. The amount of change could simply be a fixed percentage, or it might be proportional to the number of saturated pixels or a measure of the actual level of saturation. The change might also include other components that could be integral or differential in nature so as to increase or reduce responsiveness and optimize tracking. Once all LCD cells are processed 1012, the pixel data is output to the LCD array 1013.

The preferred LED driver is a 16-channel device with dot correction and grayscale PWM control available from Texas Instruments as TLC5946. The grayscale control has up to 12-bit resolution (4096 steps). The preferred design uses 8-bit resolution (256 steps) to minimize memory usage and calculation costs since anything higher would require a word (16-bit) representation. The grayscale control is simply adjusted to work with only 256 steps. The other intensity adjustment available on the preferred driver is dot correction. This is a 6-bit resolution (64 steps) that sets the specific channel current from 0% to 100%. Dot correction is typically used to adjust brightness variations between LED channels and other LED drivers. However, since the dot correction range encompasses the full drive current range it might also be used for controlling the overall display brightness making the need for a PWM determined backlight intensity no longer necessary. The backlight target intensity for the display ($BL_T$) can then be fixed to the maximum value of (255,255,255) providing the maximum range at all ambient light levels.

The output current is calculated by:

$$I_{OUTn} = I_{OLCMax} * DCn/63$$

Where:
$I_{OLCMax}$ = the maximum output current of each output
DCn = the programmed dot correction value of out n (DCn=0 to 63)

The need for using dot correction to adjust for brightness variations can be minimized by using binning techniques in selecting LEDs used within a common array. Any additional minor adjustments might be made through small value changes to the dot correction value. The currently shipping product incorporating fifteen 1 Watt LED requires no dot correction. Increasing the number of LED to 80 makes it even less likely that dot correction will be necessary.

The main disadvantage to using current control rather than PWM control for backlight target intensity is that changes in forward current introduce a slight chromaticity shift. For the LED selected this shift is within an acceptable range and requires no further correction. However, one could use the LCD to perform a color correction using the nominal forward current to chromaticity relationship.

What is claimed is:

1. A rearview assembly, comprising:
a transflective mirror element having a partially transmissive, partially reflective coating;
at least one of an ambient sensor and a glare sensor;
a liquid crystal display (LCD) positioned behind said transflective mirror element with respect to a viewer, said LCD comprising a plurality of LCD pixels;
at least one spatially controlled backlight for lighting said LCD; and
a processor configured to control at least one of an intensity of the at least one spatially controlled backlight and LCD pixels is dynamically controlled based upon content displayed on said LCD, such that said processor is configured to:
control at least one of the LCD and said at least one spatially controlled backlight with respect to at least one of said ambient sensor and said glare sensor;
determine a target scaling factor to determine an intensity of each said at least one spatially controlled backlight, wherein said target scaling factor is iteratively adjusted based on displayed content; and
determine a point spread function to determine at least one of light intensity or transparency of each LCD pixel.

2. A rearview assembly as in claim 1 wherein said spatially controlled backlighting comprises a plurality of light emitting diodes.

3. A rearview assembly as in claim 2 wherein an intensity of each light emitting diode is based upon a target backlight intensity multiplied by said target scaling factor.

4. A rearview assembly as in claim 1 wherein said liquid crystal display comprises 400×240 pixels and said backlighting comprises 80 light emitting diodes.

5. A rearview assembly as in claim 4 wherein each of said 80 light emitting diodes is associated with a cell of 40×30 pixels.

6. A rearview assembly as in claim 1, wherein said processor is a graphical processing unit configured to control said content displayed by said backlit liquid crystal display.

7. A rearview assembly, comprising:
a transflective mirror element having a partially transmissive, partially reflective coating;
at least one of an ambient sensor and a glare sensor;
at least one spatially controlled backlit liquid crystal display (LCD) positioned behind the transflective mirror element with respect to a viewer, the LCD having a plurality of LCD pixels
a spatially controlled backlight comprising a plurality of light emitting diodes (LEDs) behind said LCD, wherein a number of said light emitting diodes within said spatially controlled backlight of the backlit LCD is an even fraction of a number of pixels of the backlit LCD; and
a processor configured to dynamically control at least one of an intensity of said at least one spatially controlled backlight and LCD pixels based upon the amount of content displayed on the LCD, such that the processor is configured to:
control the LCD and the at least one spatially controlled backlight with respect to at least one of said ambient sensor and said glare sensor;
determine a target scaling factor to determine an intensity of each LED, wherein the target scaling factor is iteratively adjusted based on displayed content; and
determine a point spread function to determine at least one of light intensity or transparency of each LCD pixel.

8. A rearview assembly as in claim 7 wherein an intensity of each light emitting diode is based upon a target backlight intensity multiplied by said target scaling factor.

9. A rearview assembly as in claim 7 wherein said liquid crystal display comprises 400×240 pixels and said backlighting comprises 80 light emitting diodes.

10. A rearview assembly as in claim 9 wherein each of said 80 light emitting diodes is associated with a cell of 40×30 pixels.

11. A rearview assembly as in claim 7, wherein said processor is a graphical processing unit configured to control said content displayed by said backlit LCD.

12. A rearview assembly, comprising:
a transflective mirror element having a partially transmissive, partially reflective coating;
at least one of an ambient sensor and a glare sensor;
a backlit liquid crystal display (LCD) positioned behind said transflective mirror element with respect to a viewer
spatially controlled backlighting comprising a plurality of light emitting diodes (LEDs) behind the LCD, wherein an intensity of spatially controlled backlighting of said backlit LCD is dynamically controlled based upon the content displayed on the backlit LCD;
a first processor configured to receive an ambient light signal and a glare light signal, wherein an intensity of said backlighting is variably controlled based upon said ambient light signal and said glare light signal; and
a graphical processing unit configured to control said content displayed by said backlit liquid crystal display,
wherein at least one of the first processor and the graphical processing unit is configured to:
determine a target scaling factor to determine an intensity of each LED, wherein the target scaling factor is iteratively adjusted based on displayed content; and
determine a point spread function to determine at least one of light intensity or transparency of each LCD pixel.

13. A rearview assembly as in claim 12 wherein an intensity of each light emitting diode is based upon a target backlight intensity multiplied by said target scaling factor.

14. A rearview assembly as in claim 12 wherein said liquid crystal display comprises 400×240 pixels and said backlighting comprises 80 light emitting diodes.

15. A rearview assembly as in claim 14 wherein each of said 80 light emitting diodes is associated with a cell of 40×30 pixels.

* * * * *